UNITED STATES PATENT OFFICE.

ROBERT E. SCHMIDT, OF ELBERFELD, GERMANY, ASSIGNOR TO THE FARBENFABRIKEN, VORMALS FR. BAYER & CO., OF SAME PLACE.

BLUE ALIZARIN DYE.

SPECIFICATION forming part of Letters Patent No. 502,765, dated August 8, 1893.

Application filed May 11, 1892. Serial No. 432,612. (Specimens.) Patented in England March 12, 1892, No. 4,871.

*To all whom it may concern:*

Be it known that I, ROBERT E. SCHMIDT, doctor of philosophy and chemist, (assignor to the FARBENFABRIKEN, VORMALS FR. BAYER & Co., of Elberfeld, Germany,) a subject of the Emperor of Germany, residing at Elberfeld, Germany, have invented a new and useful Improvement in the Manufacture of Dye-Stuffs Derived from Alizarin, (for which the aforesaid FARBENFABRIKEN has already obtained Letters Patent in England, No. 4,871, dated March 12, 1892,) of which the following is a clear and exact description.

I have described and claimed in a separate specification, Serial No. 432,611, filed May 11, 1892, a new alizarin derivative which is a hexaoxyanthraquinone and results either by oxidizing alizarin pentacyanin or alizarin bordeaux in sulfuric solution with manganese dioxid, arsenic acid or other suitable oxidizing agents or by heating alizarin pentacyanin with concentrated sulfuric acid at higher temperatures or by the oxidation of anthrapurpurin in sulfuric acid solution with oxidizing agents.

My invention relates to the production of a new alizarin dye-stuff by treating the aforesaid hexaoxyanthraquinone with ammonia preferably in the presence of atmospheric air or oxygen.

In carrying out this process practically I proceed as follows: A mixture of two hundred kilos of the above described hexaoxyanthraquinone paste containing ten per cent. of alizarin hexacyanin, two thousand liters of water and three hundred liters of ammonia (twenty per cent.) are heated to 60° centigrade and thereupon a moderately rapid current of atmospheric air is allowed to pass through the resulting liquid. The reaction is complete, when a sample treated with acids yields a precipitate which dissolves in concentrated sulfuric acid with red color. When the reaction is found to be finished the liquid is mixed with such a quantity of water that the whole volume amounts to four thousand liters. After heating to the boiling point the formed dye-stuff which is precipitated by adding sulfuric or hydrochloric acid is filtered off and washed out.

My new product is a dark colored paste which is insoluble in water, dissolves in sodium carbonate solution with violet-blue, in ammonia with blue and in soda-lye with greenish-blue color. It is dissolved by hot baryta water with indigo blue color. In glacial acetic acid it dissolves with bluish-red, in alcohol likewise with bluish-red color showing a more violet tinge. Its solutions in glacial acetic acid and alcohol when looked at in the spectroscope show two absorption bands, the one in the yellow part, the other in the green part of the spectrum. It dissolves in concentrated sulfuric acid with a currant-red color and this solution likewise exhibits in spectroscopical examination two absorption bands which, however, are displaced toward the violet part of the spectrum. On adding water to its sulfuric acid solution a brown precipitate is separated.

This new dye-stuff produces on wool mordanted with alumina salts blue shades, on wool mordanted with chromium salts greenish-blue shades.

Having now described my invention, what I claim as new, and desire to secure by Letters Patent, is—

1. The process of producing a new alizarin derivative by treating the herein described hexaoxyanthraquinone with ammonia preferably in the presence of oxygen or atmospheric air.

2. The new product herein described, which is a dark colored paste, insoluble in water, soluble in sodium carbonate with violet-blue, in ammonia liquid with blue, in soda-lye with greenish-blue color, in hot baryta water with indigo-blue color, in glacial acetic acid with bluish-red color, in alcohol with bluish-red color showing a more violet tinge, and in concentrated sulfuric acid with a currant-red color, from which on adding water a brown precipitate is separated; these solutions in glacial acetic acid and alcohol when looked at in the spectroscope show two absorption bands, the one in the yellow part, the other in the green part of the spectrum, and its solution in concentrated sulfuric acid two absorption bands which are displaced toward the violet part of the spectrum; the dye-stuff produces on wool mordanted with alumina salts blue shades, and on wool mordanted with chromium salts greenish-blue shades.

In testimony whereof I have signed my name in the presence of two subscribing witnesses.

ROBERT E. SCHMIDT.

Witnesses:
WM. ESSENWEIN,
RUDOLPH FRICKE.